United States Patent
Zhang

(10) Patent No.: US 10,084,189 B2
(45) Date of Patent: Sep. 25, 2018

(54) LITHIUM ION BATTERY CATHODE ADDITIVE, FABRICATION METHOD THEREOF, LITHIUM ION BATTERY CATHODE SHEET AND LITHIUM ION BATTERY

(71) Applicant: Huawei Technologies Co., Ltd., Shenzhen, Guangdong (CN)

(72) Inventor: Qi Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 681 days.

(21) Appl. No.: 14/582,792

(22) Filed: Dec. 24, 2014

(65) Prior Publication Data

US 2015/0111099 A1    Apr. 23, 2015

Related U.S. Application Data

(63) Continuation of application No. PCT/CN2013/073436, filed on Mar. 29, 2013.

(30) Foreign Application Priority Data

Oct. 26, 2012   (CN) .......................... 2012 1 0415398

(51) Int. Cl.
```
H01M 4/62       (2006.01)
H01M 4/13       (2010.01)
H01M 4/36       (2006.01)
H01M 10/42      (2006.01)
H01M 4/04       (2006.01)
H01M 10/0525    (2010.01)
H01M 4/1395     (2010.01)
H01M 4/134      (2010.01)
```

(52) U.S. Cl.
CPC .......... *H01M 4/62* (2013.01); *H01M 4/0402* (2013.01); *H01M 4/13* (2013.01); *H01M 4/366* (2013.01); *H01M 10/0525* (2013.01); *H01M 10/4235* (2013.01); *H01M 4/134* (2013.01); *H01M 4/1395* (2013.01); *H01M 4/621* (2013.01); *H01M 4/624* (2013.01); *H01M 2220/20* (2013.01); *H01M 2220/30* (2013.01)

(58) Field of Classification Search
CPC .......... H01M 4/62; H01M 4/13; H01M 4/621; H01M 4/624; H01M 10/0525; H01M 10/4235

See application file for complete search history.

(56) References Cited

U.S. PATENT DOCUMENTS

| | | | |
|---|---|---|---|
| 5,567,474 A | 10/1996 | Dover et al. | |
| 5,776,369 A | 7/1998 | Dover et al. | |
| 9,306,208 B2 * | 4/2016 | Isshiki | H01G 11/22 |
| 2005/0244715 A1 | 11/2005 | Cho et al. | |
| 2008/0226984 A1 | 9/2008 | Lee et al. | |
| 2009/0035663 A1 | 2/2009 | Yakovieva et al. | |
| 2013/0260239 A1 | 10/2013 | Liu et al. | |

FOREIGN PATENT DOCUMENTS

| | | | |
|---|---|---|---|
| CN | 1694298 A | 11/2005 | |
| CN | 101098003 A | 1/2008 | |
| CN | 101114710 A | 1/2008 | |
| CN | 101192663 A | 6/2008 | |
| CN | 101522343 A | 9/2009 | |
| CN | 102074705 A | 5/2011 | |
| CN | 102148401 A | 8/2011 | |
| JP | 2002260661 A | 9/2002 | |
| JP | 2003303588 A | 10/2003 | |
| JP | 2006202607 A | 8/2005 | |
| JP | 2005310764 A | 11/2005 | |
| JP | 2007042285 A | 2/2007 | |
| JP | 2009152037 A | 7/2009 | |
| JP | 2010-538424 | 12/2010 | |
| JP | 2011506254 A | 3/2011 | |
| JP | 2012164624 A | 8/2012 | |
| WO | WO 2009/029270 A1 | 3/2009 | |
| WO | WO 2009/076153 A1 | 6/2009 | |
| WO | WO-2012099264 A1 * | 7/2012 | H01G 11/22 |

* cited by examiner

*Primary Examiner* — Ula C Ruddock
*Assistant Examiner* — Thomas H Parsons

(57) ABSTRACT

A lithium ion battery cathode additive includes a core-shell coating structure formed by elemental lithium powder and a polymer coated on the surface of the elemental lithium powder, where the polymer can dissolve in a carbonic ester solvent, the polymer cannot react with N,N-dimethylformamide (DMF), N,N-dimethylacetamide (DMAc), N-2-methyl pyrrolidone (NMP), tetrahydrofuran (THF), acetone or methanol, and the polymer exists stably at a temperature of 0-150° C. The lithium ion battery cathode additive may be added in a lithium ion battery cathode material as a lithium source, for compensating lithium consumption of a battery cathode in a first-time charge-discharge process. Embodiments of the present invention further provide a fabrication method of the lithium ion battery cathode additive, a lithium ion battery cathode sheet and a lithium ion battery that include the lithium ion battery cathode additive, where the lithium ion battery has high energy density and a long cycle life.

5 Claims, 1 Drawing Sheet

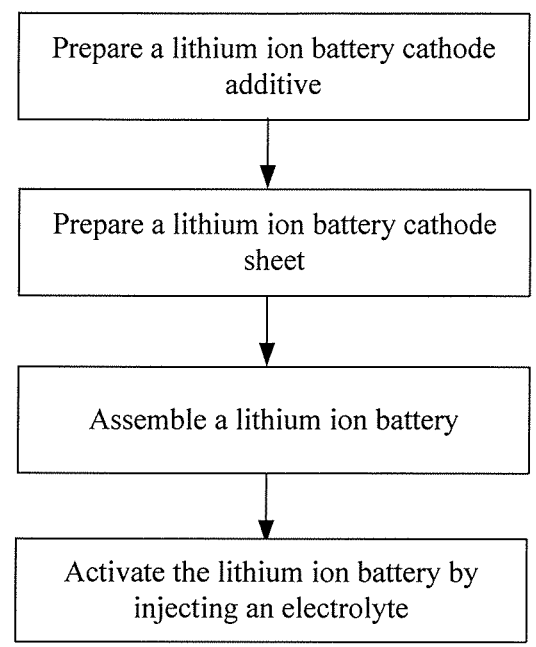

LITHIUM ION BATTERY CATHODE ADDITIVE, FABRICATION METHOD THEREOF, LITHIUM ION BATTERY CATHODE SHEET AND LITHIUM ION BATTERY

CROSS-REFERENCE TO RELATED APPLICATIONS

This application is a continuation of International Application No. PCT/CN2013/073436, filed on Mar. 29, 2013, which claims priority to Chinese Patent Application No. 201210415398.6, filed on Oct. 26, 2012, both of which are incorporated herein by reference in their entireties.

TECHNICAL FIELD

The present invention relates to the field of lithium ion batteries, and particularly, to a lithium ion battery cathode additive, a fabrication method thereof, and a lithium ion battery.

BACKGROUND

In many energy storage technologies, because of a light weight, a small volume, a high working voltage, high energy density, high output power, high charging efficiency, no memory effect, a long cycle life and other advantages, lithium ion batteries are widely applied to mobile phones, notebook computers, and other fields. In recent years, with the increase of application requirements for small-size portable devices, high-power electric automobiles, and the like, the idea of developing a lithium ion battery with higher energy density and higher power density becomes more urgent.

At present, an existing problem is as follows: an electrolyte and a cathode material react on a solid-liquid interphase layer to form a SEI film in a first-time cyclic process of a lithium ion battery system, and this process consumes lithium in active substance of the cathode material, which results in reduction of initial capacity of the lithium ion battery. Generally, the cathode material loses 10 percent capacity in a first-time charge-discharge process, and if a silicon material (4200 mAh/g and 9786 mAh/cm$^3$) with higher specific capacity is used, a first-time coulombic efficiency is even lower than 85 percent, directly resulting in loss of a plenty of capacity. In addition, the specific surface area of the cathode material is larger when the first time efficiency is lower.

For this, a current solution includes: (1) form a SEI film in priority before assembling a lithium ion battery, so as to reduce loss of irreversible capacity, for example, in the patent application document with the publication number CN102148401A, Shenzhen CBAK company indicates that a cathode sheet is infiltrated in an electrolyte under a dry condition, and is electrified by an external circuit to form a SEI film on the surface of the cathode sheet, and after cleaning and drying, the cathode sheet and other components are assembled into a battery, thereby avoiding SEI generation during first-time formation and increasing first-time efficiency; however, this solution involves rigorous technological conditions and a tedious process, which causes great cost waste, and moreover, the cathode sheet requires multiple times of cleaning and drying after the film is formed, which has a great influence on performance of an electrode sheet in various aspects, especially a binding effect of the electrode sheet, and therefore cannot ensure safety of the lithium ion battery system, or (2) provide a "lithium source" to compensate lithium ions lost by the lithium ion battery in the first-time charge/discharge process, so as to reduce inreversible capacity, for example, US FMC company achieves a purpose of reducing inreversible capacity and increasing energy density, by providing lithium metal powder that exists stably in air-stabilized lithium Metal Powder (SLMP) and introducing it into the cathode material in a slurry mixing or rolling manner, that is, compensating lithium lost for forming the SEI film in the first-time charge-discharge process of the lithium ion battery by using the additionally introduced lithium source; however, in this solution, coating of the lithium metal is mainly lithium carbonate and a small amount of lithium oxide or lithium hydroxide and hydrocarbon, and lithium carbonate remained after the lithium source participates in reaction increases internal resistance of the system, and although one part of the lithium carbonate may be dissolved by very little hydrogen fluoride in the electrolyte, the performance of the lithium ion battery may still be affected.

SUMMARY

In view of this, a first aspect of embodiments of the present invention provides a lithium ion battery cathode additive. The lithium ion battery cathode additive may be added in a lithium ion battery cathode material as a lithium source, for compensating lithium consumption of a lithium ion battery cathode in a first-time charge-discharge process. A second aspect of the embodiments of the present invention provides a fabrication method of the lithium ion battery cathode additive. A third aspect and a fourth aspect of the embodiments of the present invention separately provide a lithium ion battery cathode sheet and a lithium ion battery that include the lithium ion battery cathode additive. The lithium ion battery has high energy density and a long cycle life.

According to the first aspect, an embodiment of the present invention provides a lithium ion battery cathode additive, where the lithium ion battery cathode additive is of a core-shell coating structure formed by elemental lithium powder and a polymer coated on the surface of the elemental lithium powder, the polymer can dissolve in a carbonic ester solvent, the polymer cannot react with N,N-dimethylformamide, N,N-dimethylacetamide, N-2-methyl pyrrolidone, tetrahydrofuran, acetone or methanol, and the polymer exists stably at a temperature of 0-150° C.

The elemental lithium powder has strong metal activity, cannot exist stably in air, and if being directly added in a lithium ion battery cathode material, may cause potential safety hazards to manufacturing and use of a lithium ion battery. The lithium ion battery cathode additive provided in the first aspect of the embodiment effectively solves this problem by coating the polymer on the surface of the elemental lithium powder. Meanwhile, the polymer is a polymer or copolymer dissolvable in an electrolyte of a lithium ion battery, so that the elemental lithium powder coated in the polymer can dissolve out to participate in reaction, that is, after the elemental lithium powder dissolves out, a lithium consumption of the lithium ion battery cathode in the first-time charge-discharge process can be compensated.

Preferably, the polymer can dissolve in a carbonic ester solvent, where the carbonic ester is selected from one or more of dimethyl carbonate (DMC), diethyl carbonate (DEC), ethyl methyl carbonate (EMC) and methyl propyl carbonate (MPC). Under this preferable condition, these organic solvents have relatively low boiling points, and may be dried at a temperature of 50-80° C., thereby avoiding a problem that a side reaction easily occurs because of relatively strong activity of the elemental lithium powder at an overhigh drying temperature.

In addition, the polymer cannot react with N,N-dimethylformamide (DMF), N,N-dimethylacetamide (DMAc), N-2-methyl pyrrolidone (NMP), tetrahydrofuran (THF), acetone or methanol. This is to ensure that ingredients of the cathode additive are not damaged by these solvents in a slurry mixing process.

Preferably, the polymer is one or more of polyalkylene carbonate, polyalkylene oxide, polyalkyl siloxane, poly(alkyl acrylate) and polyalkyl methacrylate.

Preferably, a weight-average molecular weight of the polymer is 500-500000. Under this preferable condition, the polymer can well ensure a degree of polymerization, and therefore can tolerate a high temperature during coating and baking in a fabrication process of the lithium ion battery; and meanwhile, the polymer can well dissolve in the carbonic ester solvent.

The polymer exists stably at a temperature of 0-150° C., and therefore can keep heat stability in coating, baking and other processes within the temperature range.

The polymer is coated on the surface of the elemental lithium powder to isolate the elemental lithium powder from outside.

According to the second aspect, an embodiment of the present invention provides a fabrication method of a lithium ion battery cathode additive, where the fabrication method includes the following steps: dissolving a polymer in a carbonic ester solvent to form a polymer solution, charging elemental lithium powder in the polymer solution, filtering after uniformly stirring, collecting filter residue, and performing spray-drying on the filter residue at a temperature of 50-80° C. under protection of an inert gas to prepare the lithium ion battery cathode additive, where the lithium ion battery cathode additive is of a core-shell coating structure formed by the elemental lithium powder and the polymer coated on the surface of the elemental lithium powder, and the polymer cannot react with N,N-dimethylformamide, N,N-dimethylacetamide, N-2-methyl pyrrolidone, tetrahydrofuran, acetone or methanol.

Preferably, the polymer can dissolve in the carbonic ester solvent, and the carbonic ester solvent is selected from one or more of dimethyl carbonate, diethyl carbonate, ethyl methyl carbonate and methyl propyl carbonate. These organic solvents have relatively low boiling points, and may be dried at a temperature of 50-80° C., thereby avoiding a problem that a side reaction easily occurs because of relatively strong activity of the elemental lithium powder at an overhigh drying temperature.

Preferably, the polymer cannot react with N,N-dimethylformamide, N,N-dimethylacetamide, N-2-methyl pyrrolidone, tetrahydrofuran, acetone or methanol.

The polymer exists stably at a temperature of 0-150° C.

Preferably, the polymer is one or more of polyalkylene carbonate, polyalkylene oxide, polyalkyl siloxane, poly(alkyl acrylate) and polyalkyl methacrylate.

The carbonic ester solvent functions to dissolve the polymer, without any limitation on a ratio of the carbonic ester solvent to the polymer.

The polymer is coated on the surface of the elemental lithium powder to isolate the elemental lithium powder from outside.

The fabrication method of a lithium ion battery cathode additive, provided in the second aspect of the embodiment of the present invention, is simple and easy to operate, low in cost, and easy for industrial production.

According to the third aspect, an embodiment of the present invention provides a lithium ion battery cathode sheet, where the lithium ion battery cathode sheet includes a current collector and a cathode material coated on the current collector, the cathode material includes a cathode active substance, a binding agent, a conductive agent and a lithium ion battery cathode additive, the lithium ion battery cathode additive is of a core-shell coating structure formed by elemental lithium powder and a polymer coated on the surface of the elemental lithium powder, the polymer can dissolve in the carbonic ester solvent, the polymer cannot react with N,N-dimethylformamide (DMF), N,N-dimethylacetamide (DMAc), N-2-methyl pyrrolidone (NMP), tetrahydrofuran (THF), acetone or methanol, and the polymer exists stably at a temperature of 0-150° C.

Preferably, the polymer is one or more of polyalkylene carbonate, polyalkylene oxide, polyalkyl siloxane, poly(alkyl acrylate) and polyalkyl methacrylate.

Preferably, the cathode active substance is an organic compound or inorganic material capable of deintercalating/intercalating lithium ions.

Preferably, a weight ratio of the lithium ion battery cathode additive to the cathode active substance is 1:20 to 1:200.

According to the fourth aspect, an embodiment of the present invention provides a lithium ion battery, where the lithium ion battery includes a lithium ion battery anode sheet, a lithium ion battery cathode sheet, a diaphragm, a shell and an electrolyte, the lithium ion battery cathode sheet includes a current collector and a cathode material coated on the current collector, the cathode material includes a cathode active substance, a binding agent, a conductive agent and a lithium ion battery cathode additive, the lithium ion battery cathode additive is of a core-shell coating structure formed by elemental lithium powder and a polymer coated on the surface of the elemental lithium powder, the polymer can dissolve in a carbonic ester solvent, the polymer cannot react with N,N-dimethylformamide (DMF), N,N-dimethylacetamide (DMAc), N-2-methyl pyrrolidone (NMP), tetrahydrofuran (THF), acetone or methanol, and the polymer exists stably at a temperature of 0-150° C.

Preferably, the polymer is one or more of polyalkylene carbonate, polyalkylene oxide, polyalkyl siloxane, poly(alkyl acrylate) and polyalkyl methacrylate.

In the third aspect of the embodiments of the present invention and the fourth aspect of the embodiments of the present invention, for a lithium ion battery cathode sheet, a lithium ion battery structure and a fabrication method thereof, reference may all be made to conventional technologies; and compared with the conventional technologies, a difference is that the lithium ion battery cathode additive described in the first aspect is added to the lithium ion battery cathode material.

The lithium ion battery provided in the fourth aspect of the embodiments of the present invention has high energy density and a long cycle life.

Some of advantages of the embodiments of the present invention will be clarified in the following specification, where one part is obvious according to the specification, or may be learned through implementation of the embodiments of the present invention.

BRIEF DESCRIPTION OF THE DRAWINGS

FIG. 1 is a flowchart of a fabrication method of a lithium ion battery in a specific implementation manner of the present invention.

DETAILED DESCRIPTION

The following descriptions are exemplary implementation manners of the present invention. It should be noted that a person of ordinary skill in the art may make various improvements and polishing without departing from the principle of the embodiments of the present invention and these improvements and polishing shall fall within the protection scope of the present invention.

A first aspect of the embodiments of the present invention provides a lithium ion battery cathode additive. The lithium ion battery cathode additive may be added in a lithium ion battery cathode material as a lithium source, for compensating lithium consumption of a lithium ion battery cathode in a first-time charge-discharge process. A second aspect of the embodiments of the present invention provides a fabrication method of the lithium ion battery cathode additive. A third aspect and a fourth aspect of the embodiments of the present invention respectively provide a lithium ion battery cathode sheet and a lithium ion battery including the lithium ion battery cathode additive. The lithium ion battery has high energy density and a long cycle life.

According to the first aspect, an embodiment of the present invention provides a lithium ion battery cathode additive. The lithium ion battery cathode additive is of a core-shell coating structure formed by elemental lithium powder and a polymer coated on the surface of the elemental lithium powder, where the polymer can dissolve in a carbonic ester solvent, the polymer cannot react with N,N-dimethylformamide, N,N-dimethylacetamide, N-2-methyl pyrrolidone, tetrahydrofuran, acetone or methanol, and the polymer exists stably at a temperature of 0-150° C.

The elemental lithium powder has strong metal activity, cannot exist stably in air, and if being directly added in a lithium ion battery cathode material, may cause potential safety hazards to manufacturing and use of a lithium ion battery. The lithium ion battery cathode additive provided in the first aspect of the embodiment effectively solves this problem by coating the polymer on the surface of the elemental lithium powder. Meanwhile, the polymer is a polymer or copolymer dissolvable in an electrolyte of a lithium ion battery, so that the elemental lithium powder coated in the polymer can dissolve out to participate in reaction, that is, after the elemental lithium powder dissolves out, a lithium consumption of the lithium ion battery cathode in a first-time charge-discharge process can be compensated.

The polymer can dissolve in a carbonic ester solvent, where the carbonic ester solvent is selected from one or more of dimethyl carbonate (DMC), diethyl carbonate (DEC), ethyl methyl carbonate (EMC) and methyl propyl carbonate (MPC). Under this preferable condition, these organic solvents have relatively low boiling points, and may be dried at a temperature of 50-80° C., thereby avoiding a problem that a side reaction easily occurs because of relatively strong activity of the elemental lithium powder at an overhigh drying temperature.

In addition, the polymer cannot react with N,N-dimethylformamide (DMF), N,N-dimethylacetamide (DMAc), N-2-methyl pyrrolidone (NMP), tetrahydrofuran (THF), acetone or methanol. This is to ensure that ingredients of the cathode additive are not damaged by these solvents in a slurry mixing process.

The polymer is one or more of polyalkylene carbonate, polyalkylene oxide, polyalkyl siloxane, poly(alkyl acrylate) and polyalkyl methacrylate.

A weight-average molecular weight of the polymer is 500-500000. Under this preferred condition, the polymer can well ensure a degree of polymerization, and therefore can tolerate a high temperature during coating and baking in a fabrication process of the lithium ion battery; and meanwhile, the polymer can dissolve in the carbonic ester solvent well.

The polymer exists stably at a temperature of 0-150° C., and therefore can keep heat stability in coating, baking and other processes within the temperature range.

The polymer is coated on the surface of the elemental lithium powder to isolate the elemental lithium powder from outside.

According to the second aspect, an embodiment of the present invention provides a fabrication method of a lithium ion battery cathode additive. The fabrication method includes the following steps: dissolving a polymer in a carbonic ester solvent to form a polymer solution, charging elemental lithium powder in the polymer solution, filtering after uniformly stirring, collecting filter residue, and performing spray-drying on the filter residue at a temperature of 50-80° C. under protection of an inert gas to prepare the lithium ion battery cathode additive, where the lithium ion battery cathode additive is of a core-shell coating structure formed by the elemental lithium powder and the polymer coated on the surface of the elemental lithium powder, and the polymer cannot react with N,N-dimethylformamide, N,N-dimethylacetamide, N-2-methyl pyrrolidone, tetrahydrofuran, acetone or methanol.

The polymer can dissolve in the carbonic ester solvent, and the carbonic ester solvent is selected from one or more of dimethyl carbonate, diethyl carbonate, ethyl methyl carbonate and methyl propyl carbonate. These organic solvents have relatively low boiling points, and may be dried at a temperature of 50-80° C., thereby avoiding a problem that a side reaction easily occurs because of relatively strong activity of the elemental lithium powder at an overhigh drying temperature.

The polymer cannot react with N,N-dimethylformamide, N,N-dimethylacetamide, N-2-methyl pyrrolidone, tetrahydrofuran, acetone or methanol.

The polymer exists stably at a temperature of 0-150° C.

The polymer is one or more of polyalkylene carbonate, polyalkylene oxide, polyalkyl siloxane, poly(alkyl acrylate) and polyalkyl methacrylate.

The carbonic ester solvent functions to dissolve the polymer, without any limitation on a ratio of the carbonic ester solvent to the polymer.

The polymer is coated on the surface of the elemental lithium powder to isolate the elemental lithium powder from outside.

The fabrication method of a lithium ion battery cathode additive, provided in the second aspect of the embodiment of the present invention, is simple and easy to implement, low in cost, and easy for industrial production.

According to the third aspect, an embodiment of the present invention provides a lithium ion battery cathode sheet. The lithium ion battery cathode sheet includes a current collector and a cathode material coated on the current collector. The cathode material includes a cathode active substance, a binding agent, a conductive agent and a lithium ion battery cathode additive. The lithium ion battery cathode additive is of a core-shell coating structure formed by elemental lithium powder and a polymer coated on the surface of the elemental lithium powder. The polymer can dissolve in a carbonic ester solvent, the polymer cannot react with N,N-dimethylformamide (DMF), N,N-dimethylacetamide (DMAc), N-2-methyl pyrrolidone (NMP), tetrahydrofuran (THF), acetone or methanol, and the polymer exists stably at a temperature of 0-150° C.

The polymer is one or more of polyalkylene carbonate, polyalkylene oxide, polyalkyl siloxane, poly(alkyl acrylate) and polyalkyl methacrylate.

The cathode active substance is an organic compound or inorganic material capable of deintercalating/intercalating lithium ions.

A weight ratio of the lithium ion battery cathode additive to the cathode active substance is 1:20 to 1:200.

According to the fourth aspect, an embodiment of the present invention provides a lithium ion battery. The lithium ion battery includes a lithium ion battery anode sheet, a lithium ion battery cathode sheet, a diaphragm, a shell and an electrolyte. The lithium ion battery cathode sheet includes a current collector and a cathode material coated on the current collector. The cathode material includes a cathode active substance, a binding agent, a conductive agent and a lithium ion battery cathode additive. The lithium ion battery cathode additive is of a core-shell coating structure formed by elemental lithium powder and a polymer coated on the surface of the elemental lithium powder. The polymer can dissolve in a carbonic ester solvent, the polymer cannot react with N,N-dimethylformamide (DMF), N,N-dimethylacetamide (DMAc), N-2-methyl pyrrolidone (NMP), tetrahydrofuran (THF), acetone or methanol, and the polymer exists stably at a temperature of 0-150° C.

The polymer is one or more of polyalkylene carbonate, polyalkylene oxide, polyalkyl siloxane, poly(alkyl acrylate) and polyalkyl methacrylate.

In the third aspect of the embodiments of the present invention and the fourth aspect of the embodiments of the present invention, for a lithium ion battery cathode sheet, a lithium ion battery structure and a fabrication method thereof, reference may all be made to conventional technologies; and compared with the conventional technologies, a difference is that the lithium ion battery cathode additive described in the first aspect is added in the lithium ion battery cathode material. FIG. 1 is a flowchart of a fabrication method of a lithium ion battery in a specific implementation manner of the present invention.

The lithium ion battery provided in the fourth aspect of the embodiments of the present invention has high energy density and a long cycle life.

The embodiment of the present invention is not limited to the following specific embodiments. Without changing the scope of independent claims, implementation may be approximately altered.

Embodiment 1

A fabrication method of a lithium ion battery cathode additive includes the following steps:

Dissolve 25 g of polypropylene carbonate with a weight-average molecular weight of 50000 in 200 g of ethyl methyl carbonate (EMC) to form a polymer solution, stir at a low speed for 15 minutes, charge 10 g of elemental lithium powder in the polymer solution, stir for 30 minutes, perform filtering, collect filter residue, wash the filter residue by using deionized water in a flowing manner, and then perform spray-drying on the filter residue at a temperature of 80° C. under an argon shield with a temperature of 70° C. to prepare the lithium ion battery cathode additive.

The lithium ion battery cathode additive is of a core-shell coating structure formed by the elemental lithium powder and the polymer coated on the surface of the elemental lithium powder.

Fabrication of a Lithium Ion Battery Cathode Sheet:

Add 25 g of polyvinylidene fluoride (PVDF) in 500 g of N-2-methyl pyrrolidone (NMP), stir for 4 hours, then add 10 g of lithium ion battery cathode additive prepared in this embodiment, stir at a low speed for 2 hours, then add 25 g of acetylene black, stir at a low speed for 2 hours, then add 400 g of silicon/silicon dioxide composite material, stir at a low speed for 2 hours, and then perform dispersing at a high speed under protection of cooling water with a temperature of 8° C. for 1 hour to obtain a stable silicon cathode slurry.

Coat the silicon cathode slurry on a glazed copper foil with a coating weight of 5.26 g/cm$^2$ (not including the copper foil) to form an electrode; bake and dry the electrode with an oven at a temperature of 90-120° C.; roll the baked and dried electrode sheet, where a thickness of the rolled electrode sheet is 0.078 mm; and slit the rolled electrode sheet into a bar-type electrode with a width of 40 mm.

Fabrication of a Lithium Ion Battery:

Add a mixture of 200 g of anode active material LiCoO$_2$, 6 g of binding agent polyvinylidene fluoride (PVDF) and 4 g of conductive agent acetylene black in 60 g of N-methyl-2 pyrrolidone (NMP), firstly stir at a low speed for 4 hours, and then perform dispersing at a high speed under protection of cooling water with a temperature of 8° C. for 1 hour to form a uniform anode slurry. Coat the slurry on a 16 μm aluminum foil uniformly and control surface density of coating to be 23 g/cm$^2$, then bake and dry the coated aluminum foil at a temperature of 120° C., roll the foil to a required thickness, then slit the foil into an anode sheet with a width of 39 mm, and cut the anode sheet into an anode sheet matching the cathode sheet in a length requirement.

Coil the above obtained cathode electrode and anode electrode with an isolating membrane and then pre-seal them with an aluminum-plastics membrane, inject 10 g of electrolyte containing 1 mol of lithium hexafluorophosphate in a solvent (a volume ratio of ethylene carbonate to methyl ethyl carbonate to diethyl carbonate is 1:1:1) into the foregoing battery, and form and grade to obtain the lithium ion battery. A thickness of the battery is designed to be 5.5 mm.

Embodiment 2

A fabrication method of a lithium ion battery cathode additive includes the following steps:

Dissolve 25 g of polyethylidene oxide with a weight-average molecular weight of 50000 in 200 g of ethyl methyl carbonate (EMC) to form a polymer solution, stir at a low speed for 15 minutes, charge 10 g of elemental lithium powder in the polymer solution, stir for 30 minutes, perform filtering, collect filter residue, wash the filter residue by using deionized water in a flowing manner, and then perform spray-drying on the filter residue at a temperature of 70° C. under an argon shield with a temperature of 60° C. to prepare the lithium ion battery cathode additive.

The lithium ion battery cathode additive is of a core-shell coating structure formed by the elemental lithium powder and the polymer coated on the surface of the elemental lithium powder.

Fabrication of a Lithium Ion Battery Cathode Sheet:

Add 25 g of polyvinylidene fluoride (PVDF) in 500 g of N-2-methyl pyrrolidone (NMP), stir for 4 hours, then add 20 g of lithium ion battery cathode additive prepared in this embodiment, stir at a low speed for 2 hours, then add 25 g of acetylene black, stir at a low speed for 2 hours, then add 400 g of silicon/silicon dioxide composite material, stir at a low speed for 2 hours, and then perform dispersing at a high speed under protection of cooling water with a temperature of 8° C. for 1 hour to obtain a stable silicon cathode slurry.

Subsequent steps in a process of manufacturing and assembling a lithium ion battery are completely identical to those in Embodiment 1.

Effect Embodiment

Reference example 1: all manufacturing manners are completely identical to those in Embodiment 1, and only no lithium ion battery cathode additive is added in the fabrication process of the silicon cathode slurry. An initial thickness of a flexibly-packaged battery prepared in the reference example 1 is also designed to be 5.5 mm.

After capacity testing and 50 1 C charge-discharge cycles at a normal temperature for each of the batteries prepared in Embodiment 1, Embodiment 2 and the reference example 1, capacity data of the batteries are collected, and a specific comparison of data is shown in the following Table 1.

TABLE 1

Comparison of battery capacities in Embodiment 1, Embodiment 2 and reference example 1

|  |  | Embodiment 1 | Embodiment 2 | Reference example 1 |
|---|---|---|---|---|
| First-time cycle | First-time charge capacity (mAh) | 2176 | 2103 | 2187 |
|  | First-time discharge capacity (mAh) | 1919 | 1982 | 1824 |
|  | First-time efficiency (%) | 88.2 | 94.0 | 83.4 |
| 50 cycles | Discharge capacity after 50 cycles (mAh) | 1629 | 1687 | 1463 |
|  | Capacity retention ratio (%) | 84.9 | 85.1 | 80.2 |

As shown in the above Table 1, to a silicon material, the first-time cycle capacity of the two embodiments in which the lithium ion battery cathode additive is added is remarkably increased in comparison with that of the reference example 1, with an increase rate of about 5%-10%; and, because of the introduction of the lithium ion battery cathode additive, cyclic performance in the two embodiments is also superior to that of the reference example 1, and the capacity retention ratio after 50 cycles is increased by about 5%.

Embodiment 3

A fabrication method of a lithium ion battery cathode additive includes the following steps:

Dissolve 25 g of polyethylsiloxane with a weight-average molecular weight of 100000 in 200 g of ethyl methyl carbonate (EMC) to form a polymer solution, stir at a low speed for 15 minutes, charge 10 g of elemental lithium powder in the polymer solution, stir for 30 minutes, perform filtering, collect filter residue, wash the filter residue by using deionized water in a flowing manner, and then perform spray-drying on the filter residue at a temperature of 80° C. under an argon shield with a temperature of 70° C. to prepare the lithium ion battery cathode additive.

The lithium ion battery cathode additive is of a core-shell coating structure formed by the elemental lithium powder and the polymer coated on the surface of the elemental lithium powder.

Fabrication of a Lithium Ion Battery Cathode Sheet:

Add 25 g of polyvinylidene fluoride (PVDF) in 500 g of N-2-methyl pyrrolidone (NMP), stir for 4 hours, then add 2 g of lithium ion battery cathode additive prepared in this embodiment, stir at a low speed for 2 hours, then add 25 g of Super P, stir at a low speed for 2 hours, then add 400 g of graphite cathode material, stir at a low speed for 2 hours, and then perform dispersing at a high speed under protection of cooling water with a temperature of 8° C. for 1 hour to obtain a stable silicon cathode slurry.

Subsequent steps in a process of manufacturing and assembling a lithium ion battery are completely identical to those in Embodiment 1.

Embodiment 4

A fabrication method of a lithium ion battery cathode additive includes the following steps:

Dissolve 25 g of polymethyl acrylate with a weight-average molecular weight of 100000 in 200 g of dimethyl carbonate (DMC) to form a polymer solution, stir at a low speed for 15 minutes, charge 10 g of elemental lithium powder in the polymer solution, stir for 30 minutes, perform filtering, collect filter residue, wash the filter residue by using deionized water in a flowing manner, and then perform spray-drying on the filter residue at a temperature of 70° C. under an argon shield with a temperature of 60° C. to prepare the lithium ion battery cathode additive.

The lithium ion battery cathode additive is of a core-shell coating structure formed by the elemental lithium powder and the polymer coated on the surface of the elemental lithium powder.

Fabrication of a Lithium Ion Battery Cathode Sheet:

Add 25 g of polyvinylidene fluoride (PVDF) in 500 g of N-2-methyl pyrrolidone (NMP), stir for 4 hours, then add 5 g of lithium ion battery cathode additive prepared in this embodiment, stir at a low speed for 2 hours, then add 25 g of Super P, stir at a low speed for 2 hours, then add 400 g of graphite cathode material, stir at a low speed for 2 hours, and then perform dispersing at a high speed under protection of cooling water with a temperature of 8° C. for 1 hour to obtain a stable silicon cathode slurry.

Subsequent steps in a process of manufacturing and assembling a lithium ion battery are completely identical to those in Embodiment 1.

Reference example 2: all manufacturing manners are completely identical to those in Embodiment 3, and only no lithium ion battery cathode additive is added in the fabrication process of the silicon cathode slurry. An initial thickness of a flexibly-packaged battery prepared in the reference example 2 is also designed to be 5.5 mm.

After capacity testing and 50 1 C charge-discharge cycles at a normal temperature for each of the batteries prepared in Embodiment 3, Embodiment 4 and the reference example 2, capacity data of the batteries are collected, and a specific comparison of data is shown in the following Table 2.

TABLE 2

Comparison of battery capacities in Embodiment 3, Embodiment 4 and reference example 2

|  |  | Embodiment 3 | Embodiment 4 | Reference example 2 |
|---|---|---|---|---|
| First-time cycle | First-time charge capacity (mAh) | 1814 | 1807 | 1819 |
|  | First-time discharge capacity (mAh) | 1707 | 1722 | 1650 |
|  | First-time efficiency/% | 94.1 | 95.3 | 90.7 |
| 50 cycles | Discharge capacity after 50 cycles (mAh) | 1666 | 1686 | 1597 |
|  | Capacity retention ratio (%) | 97.6 | 97.9 | 96.8 |

As shown in the above Table 2, to a graphite material, although the effect of the cathode additive is not obvious from the point of cyclic performance, the first-time cycle capacity in the embodiments in which the lithium ion battery cathode additive is added is remarkably increased in comparison with that in the reference example 2, and the increase rate is about 5%.

What is claimed is:

1. A lithium ion battery cathode additive, comprising:
a core-shell coating structure formed by elemental lithium powder and a polymer coated on the surface of the elemental lithium powder,
wherein the polymer comprises polyalkylene carbonate, and
wherein the polymer can dissolve in a carbonic ester solvent, the polymer cannot react with N,N-dimethylformamide, N,N-dimethylacetamide, N-2-methyl pyrrolidone, tetrahydrofuran, acetone or methanol, and the polymer exists stably at a temperature of 0-150° C.

2. The lithium ion battery cathode additive according to claim 1, wherein the carbonic ester solvent is selected from one or more of dimethyl carbonate, diethyl carbonate, ethyl methyl carbonate and methyl propyl carbonate.

3. A lithium ion battery cathode sheet, comprising:
a current collector;
a cathode material coated on the current collector and comprising a cathode active substance, a binding agent, a conductive agent and a lithium ion battery cathode additive, wherein the lithium ion battery cathode additive comprises a core-shell coating structure formed by elemental lithium powder and a polymer coated on the surface of the elemental lithium powder,
wherein the polymer comprises polyalkylene carbonate, and
wherein the polymer can dissolve in the carbonic ester solvent, the polymer cannot react with N,N-dimethylformamide (DMF), N,N-dimethylacetamide (DMAc), N-2-methyl pyrrolidone (NMP), tetrahydrofuran (THF), acetone or methanol, and the polymer exists stably at a temperature of 0-150° C.

4. The lithium ion battery cathode sheet according to claim 3, wherein the carbonic ester solvent is selected from one or more of dimethyl carbonate, diethyl carbonate, ethyl methyl carbonate and methyl propyl carbonate.

5. A lithium ion battery, comprising:
a lithium ion battery cathode sheet comprising,
a current collector, and
a cathode material coated on the current collector and comprising a cathode active substance, a binding agent, a conductive agent and a lithium ion battery cathode additive;
a diaphragm, a shell and an electrolyte; and
wherein the lithium ion battery cathode additive comprises a core-shell coating structure formed by elemental lithium powder and a polymer coated on the surface of the elemental lithium powder, the polymer can dissolve in a carbonic ester solvent, the polymer cannot react with N,N-dimethylformamide (DMF), N,N-dimethylacetamide (DMAc), N-2-methyl pyrrolidone (NMP), tetrahydrofuran (THF), acetone or methanol, the polymer exists stably at a temperature of 0-150° C., and the polymer comprises polyalkylene carbonate.

* * * * *